Nov. 23, 1971  J. ZOCHER  3,621,813
FLOCKING APPARATUS
Filed Aug. 14, 1968  3 Sheets-Sheet 1

WITNESS:

INVENTOR.
Josef Zocher
BY
ATTORNEY

Nov. 23, 1971   J. ZOCHER   3,621,813
FLOCKING APPARATUS

Filed Aug. 14, 1968   3 Sheets-Sheet 3

INVENTOR.
Josef Zocher
BY
ATTORNEY

WITNESS:
Patrick McDonnell

United States Patent Office 3,621,813
Patented Nov. 23, 1971

3,621,813
FLOCKING APPARATUS
Josef Zocher, Haaren, Aachen, Germany, assignor to
The Singer Company, New York, N.Y.
Filed Aug. 14, 1968, Ser. No. 752,565
Int. Cl. B05b 17/04
U.S. Cl. 118—308          3 Claims

ABSTRACT OF THE DISCLOSURE

This disclosure relates to apparatus for flocking and more particular to a device for dosing flocking material in an even and controlled manner. The device for dosing the flocking material operates in a manner so that the flocking material is dispensed therefrom in a relatively even flow and includes a means for vibrating the dosing device. The combination of the dosing device and the means for vibrating the same provide a novel combination which produces desirable results not obtained with apparatus previously known in the prior art.

BRIEF SUMMARY OF INVENTION

This invention relates to flocking apparatus and in particular, means for dosing flocking material hereinafter referred to as flock, in an electrostatic field, although it should be understood that the invention is not restricted to the application of so called electrostatic flocking apparatus. One known apparatus in the art for dosing flock comprises a rotating brush arrangement whereby the brush forces the flock through a sieve, the flock being preferably composed of small fibers. Such brush type dosing devices have certain inerent disadvantages. Among these, are the formation of small balls of flock which form as a result of the flock being pushed across the sieve by the brushes. These balls which mass together continue to grow in size during the dosing operation and eventually have to be removed as waste material. Further the formation of such masses of flock inhibits further supply of the flock to the work piece to which the flock is to be applied. It is desirable to dispense the flock as evenly as possible and to be able to control the limit on the output of the material. With the brush type apparatus this is not possible because the brushes tend to push the flock together thereby continuously increasing the density of the balls thus formed, as described above. In addition, the brushes exert a strong mechanical strain on the flock which can damage their surface preparation and, also, since the fibers become embedded in the brushes the brushes must be changed relatively frequently, particularly when different colors are used in the flocking operation. It has also been known that the output of this known type flocking means can only be changed within certain limits, because when the brushes rotate too slowly, the intervals between the intermittently brushed-through flock becomes too large, and when the brushes rotate too quickly the flock no longer passes through the sieve and is merely pushed across the surface thereof.

It is the prime purpose of the invention to provide a means for dosing flock onto a working surface or body wherein the flock does not form into balls and wherein the output of the flock can be relatively easily regulated within wide limits. Further, with the apparatus of the invention described herein the flock can be distributed across relatively large surfaces and the apparatus can be run completely empty before changing into another type of flocked material and then be furnished with new flocking material without previous cleaning. Preferably, the apparatus of the invention comprises a vibrating hopper which is formed so as to form a closed path and the bottom of which is at least partly made as a sieve. It has been shown that under the influence of the novel vibrating motion of the hopper of the invention, small balls of material which may be contained in the fresh supply of flock are completely dissolved and that the flock, which reacts somewhat like a fluid during the dosing operation, maintains its loose texture. A prime advantage of the invention resides in the even distribution of the flock obtained and the comparative ease of regulation of the output of the flock within relatively wide limits. As will be more apparent hereinafter, means are provided for initiating vibrating motion to the flocking apparatus in what may be described in a screw-wise path. Further, because of the closed path provided by the apparatus, the flocked material will be moved along said path until it falls through an openings in the sieve bottom to enter the electrostatic field and there will be substantially no surplus flock dispensed by the device so that an overflow collection and return device need not be provided as is customary in present day dosing devices for flocking apparatus.

In one preferred embodiment of the invention, electromagnetic vibrators are provided whose operating voltage may be adjusted, as well as the frequency, if desired, so that the quantity of flock delivered by the device can be readily varied. Thus, the range of output of the apparatus can vary from the minimum of flock fibers being dispensed in a thin veil to an output of a heavy curtain of flock. It is also possible by providing suitable control means to maintain flock output relatively constant as will be apparent hereinafter. Further, it is also possible to provide apparatus of the type of the invention which is capable of flocking single objects as well as continually movable webs of material from rolls or the like.

Accordingly, it is a primary object of the invention to provide a novel and improved dosing device for flocking apparatus or the like.

It is another object of the invention to provide a novel and improved dosing device for a flocking apparatus which is capable of providing evenly distributed flock material.

It is a further object of the invention to provide a novel and improved dosing device which is of the vibrating type and includes novel means for initiating the flow of the flocked material.

Other objects and advantages of the invention will be best understood upon reading the following detail description with the accompanying drawings.

BRIEF DESCRIPTION OF DRAWINGS

FIG. 3a is a sectional view taken along line 1—1 of FIG. 2a,

DETAILED DESCRIPTION OF THE INVENTION

Figure 1:
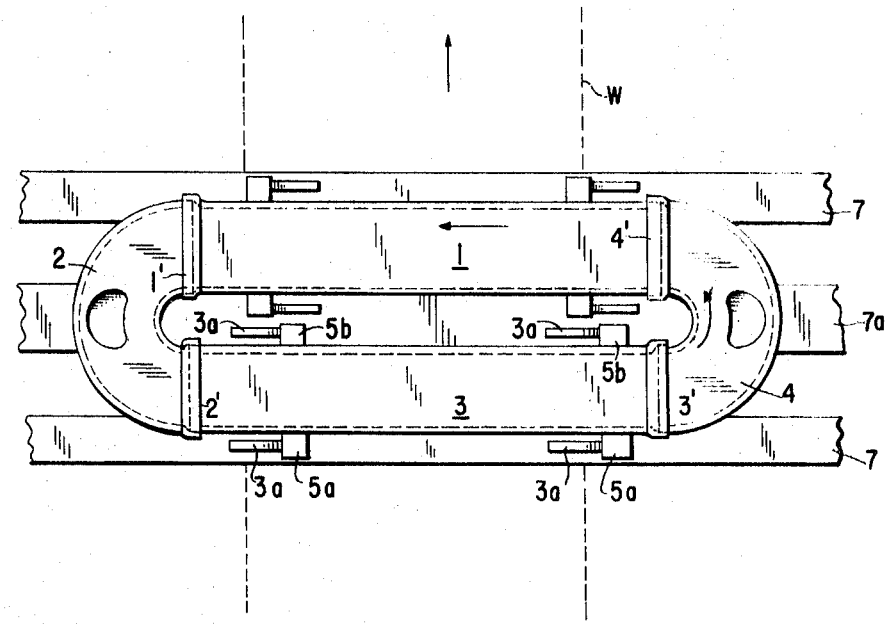
FIG. 1 shows a top plan view of a dosing device for a flocking machine of the invention.

FIG. 1 illustrates a top view of a hopper for holding a supply of flock material. As will be apparent from FIG. 1, the hopper forms a closed path for the flock which is to be distributed on a substrate material or working body. The hopper consists of two straight, substantially parallel sections 1 and 3 and two curved transition sections 2 and 4 which make up an elliptically-shaped arrangement for the hopper. The straight sections 1 and 3 of the hopper are provided at their bottom-most portions with a sieve partially illustrated in FIGS. 2A–3B, which sieve may have round or slot-shaped holes therein. Although not illustrated as such, the sieves in the sections 1 and 3 are detachably mounted so that they may be interchanged with sieves having different shaped and/or numbers of holes for varying the distribution of the flock. It should also be understood that the two curved parts 2 and 4 may also be provided with a sieve structure, if desired.

Figure 2A:
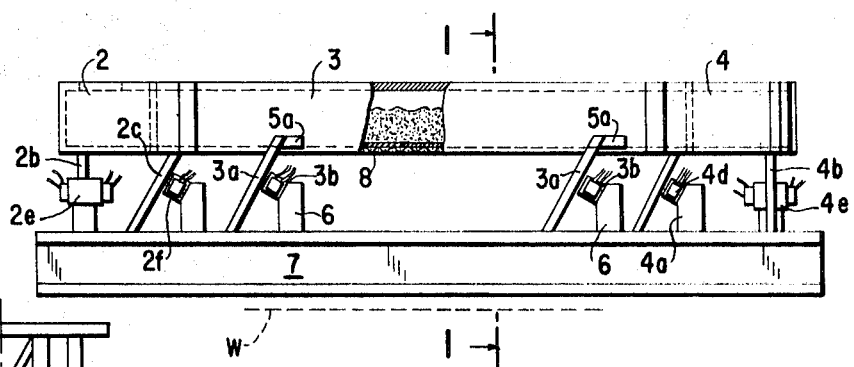
FIG. 2a shows a side view of the device illustrated in FIG. 1.

As briefly explained above, the hopper is intended to be vibrated for initiating the distribution of the flocking material. For this purpose, the hopper sections 1 and 3 are suspended by transversely postioned springs 3a, which springs 3a are supported at their upper ends on the outside of the sections 1 and 3 by supports 5a and at the inside thereof by supports 5b. The springs 3a are supported at their opposite ends on a support structure 7. Disposed adjacent each spring 3a are means for initiating vibratory action of the springs 3a and preferably include electromagnetic actuators or vibrators, such as solenoids or the like, as illustrated in FIG. 2a. The electromagnetic vibrators 3b when actuated initiate relatively short lateral movement as well as upward and downward vibratory movement so that a kind of a throwing force is exerted on the flock contained in the hopper. The same arrangement of electromagnetic vibrators and springs is provided on the straight section 1 as on the straight section 3 but the orientation of the springs and vibrators are rotated at an angle of 180°. Also, a suitable control mechanism may be provided (not shown) whereby the voltage and/or frequency of the electromagnetic actuators can be varied for bringing about changes in the vibrating action of the hopper and thereby a change in the distribution in the flock material.

Figure 2B:
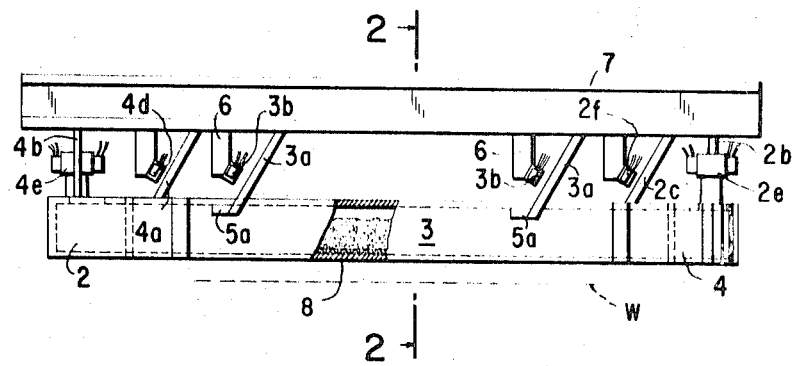
FIG. 2b is a view similar to that shown in FIG. 2a but illustrating another embodiment of the invention.
Figure 4:
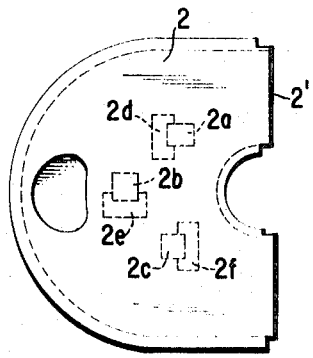
FIG. 4 shows an enlarged top plan view of a portion of the embodiment of FIG. 1.

FIG. 2b illustrates a similar arrangement to that shown in FIG. 2a with the exception of the hopper being located below the support 7 for the hopper 7 instead of said support 7 being provided beneath the hopper as illustrated in FIG. 2a. FIGS. 2a, 2b and 4 further illustrate the arrangement of the vibration producing means for the curved transition parts 2 and 4. Each of the hopper parts 2 and 4 is connected with three transversely positioned springs 2a, 2b and 2c for section 2, and 4a, 4b for section 4. An additional spring (not shown) is also provided and so arranged that it is a reflection of spring 4a. Positioned adjacent to the aforementioned springs and in operable association therewith are vibrator mechanisms 2d–f and 4d, 4e and preferably an additional vibrator (not shown) is provided for the aforementioned spring also not illustrated. The springs associated with the curved sections 2 and 4 and their associated vibrating means are positioned radially with respect to the hopper portion and at substantially at right angles to each other so that when the vibrator means are actuated the hopper mechanism will will vibrate in a screw-like path.

As illustrated in FIG. 1, the curved sections 2 and 4 may be provided with openings for supplying flock to the hopper mechanism but it should be understood that the supply openings may be provided in the sections 1 and 3, if desired. As further illustrated in FIG. 1, during operation the flock in the hopper flows in the path of the arrows shown in FIG. 1. In the embodiment of FIG. 2b, the flock will have a motion with respect to the hopper which is in the opposite direction from the embodiment of FIGS. 1 and 2a. To insure that the flock flows through the connecting portions including the curved sections 2, 4 and the straight sections 1 and 3, a tongue construction 1′, 2′, 3′ and 4′ is provided between the curved sections and straight sections of the hopper with the tongues extending into the hopper section in the direction of the movement of the flock.

Because of the construction of the hopper illustrated in FIGS. 1, 2a, 2b and 4 it is possible to flock substrate materials having a substantially wide working width. The working width can be readily enlarged by providing longer straight sections 1 and 3. As illustrated in FIG. 1, the letter W illustrates the width of the working substrate material or web passing under the hopper which is defined between the dotted lines shown in FIG. 1.

As will be understood from FIGS. 2a, 2b and 3, the ends of the springs remote from the supports at the hopper end thereof are attached to supports 7, 7a, which are larger in mass than the hopper itself. This is necessary so that the entire vibrating energy produced by the vibrating means will be transferred to the hopper itself.

Figure 3B:
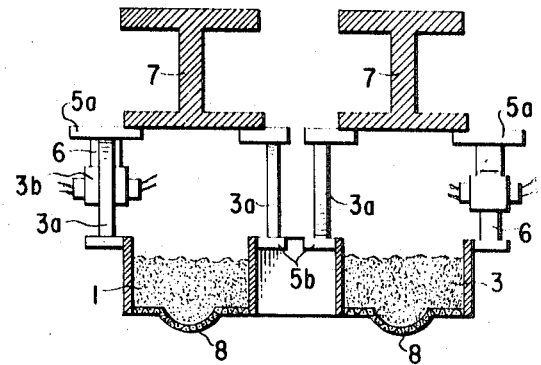
FIG. 3b is a sectional view taken along line 2—2 of FIG. 2b.
Figure 3A:
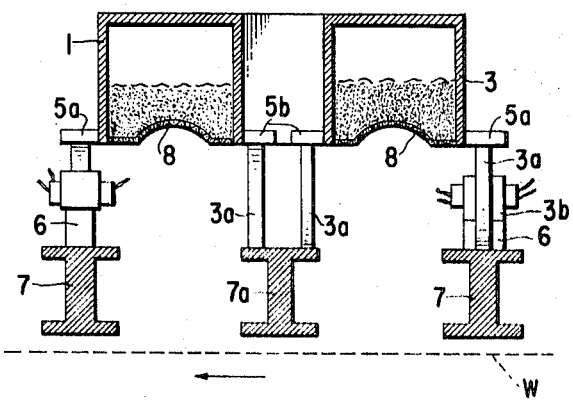

In FIGS. 3a and 3b it will be seen that the cross section of the sieve bottom 8 is concave and forms a longitudinal rib which functions to eliminate resonance of the sieve structure itself which is preferably made of a perforated metal. As will be obvious, the holes in the sieve can be either round, slot-shaped or shaped in some other manner, as desired. It is also possible to provide only desired portions of the sieve with holes in accordance with the flocking operation. Since the substrate material to be flocked must first pass below the straight section 3 in the direction of the arrows it is possible to furnish the sieve bottom of the straight section 3 with more or less widespread holes than in the case of the sieve structure of the straight section 1. By this means, a pre and after flocking of the material can be accomplished which in many cases leads to greater uniformity of the finished flocked material.

The embodiment illustrated in FIGS. 1–4 can readily be adapted for a variety of applications. For example, it is possible to partition the vibrating hopper by means of a longitudinal partition disposed in the straight portions 1 and 3 thereby furnishing two parallel and separate channels which can be supplied with differently colored or different types of flock material. Also, the sieve holes in one channel and the sieve holes of another channel can be staggered and different color flock used to provide striped patterns. Colors of the stripes in this adaptation would blend due to the scattering action of the flock affected in the electrostatic field of the flocking apparatus. It is further possible to construct the device so that the vibrating hopper repeatedly crosses the path of the substrate material to be flocked. The free ends of the movable hopper would then be arranged so that the curved parts would be connected with a straight section running substantially parallel to the path of the material to be flocked. As mentioned above, by providing a suitable control mechanism the vibrating hopper can be very accurately controlled through adjustments of the voltage to the electromagnetic vibrators or through variation of the frequency of the applied current. In this manner the output of the flock can always be maintained at an even flow whether the adjustment is provided for supplying small quantities or large quantities of flock.

Figure 5:
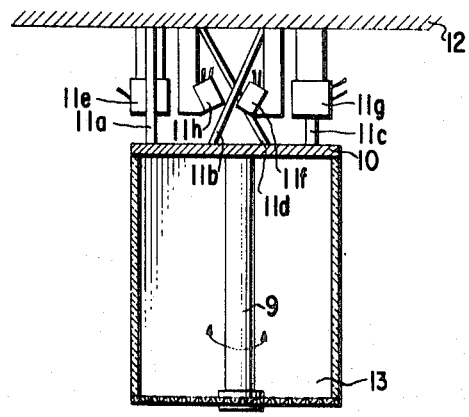
FIG. 5 shows a sectional side view of another embodiment of the invention.

The embodiment illustrated in FIG. 5 is primarily adapted for flocking single bodies, such as for example, shoes, handbags, or the like. In the embodiment of FIG. 5 a round sieve portion 13 is provided which is connected substantially at its middle portion by a rod 9 which is supported at its upper end at a plate 10. The support plate 10 is provided with springs 11a, 11d and 11b, 11c and which are disposed radially relative to the plate 10 and are positioned relative to each other at an angle of substantially 90°. The springs are supported on plate 10 in a similar manner as that disclosed for the above embodiment. Disposed adjacent to the springs 11a–d and in operable cooperation therewith are electromagnetic vibrators 11e–h. As disclosed above, the electromagnetic vibrators and their associated springs are disposed so that in operation the sieve is moved in a substantial screw-wise direction. During this operation the flocked particles in the sieve will be at an even flow and pass evenly through the sieve 13. It is also within the scope of the invention to provide a control device such as that disclosed above in the embodiment of FIG. 5.

Figure 6:
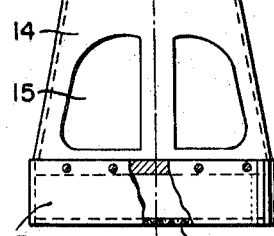
FIG. 6 shows a side view of still another embodiment of the invention.

The embodiment of FIG. 6 is substantially similar to that disclosed in relation to FIG. 5, with the exception that a hollow, cylindrical or conical connecting outer body 14 is provided. Recesses or openings 15 are provided in the conical body 14 for supplying flock material to the sieve 13.

It will be apparent from the above description that in the embodiments set forth herein a relatively accurate and even supply of flock can be provided. The flock in the hopper is vibrated along with the hopper which has a screw-like motion so that said flock is kept constantly moving in the hopper and cannot collect in ball-like formations which was a defect in the brush type devices. Further, the supply of the flock from the hopper is substantially independent of the volume of flock supplied to the hopper as long as there is sufficient amounts supplied so that there will be some flock present to be vibrated through the sieve. It is also relatively easy to vary the quantity or density of the supply of the flock material by the provision of a simple control device for varying the voltage or frequency of the electromagnetic vibrator mechanisms. Although preferably electromagnetic vibrators are used it is within the scope of the invention to provide mechanical means, as for example, rotating unbalanced masses which are disposed in association with spring members to provide the same vibrating motion as the electromagnetic vibrators. It will further be apparent that there is no need for an overflow or bin type recirculation mechanism as is commonly used in flocking machines since the flow of the flock material through the novel structure of the device is always relatively even and the quantity can be relatively accurately controlled. In other words, there is no requirement for supplying a surplus of flock material in order to insure even distribution of the flock material on the working body to be covered. If it is desired to change colors or types of flock material from one type of operation to another, it is only necessary to operate the device for a short time while it is empty instead of going through a laborious cleaning operation as is required in the mechanisms commonly used today.

While the invention has been described in its preferred embodiments, it will be obvious to those skilled in the art that various modifications and changes may be made without departing from the spirit and scope of the claims as set forth hereinafter.

Having thus set forth the nature of the invention, what I claim herein is:

1. In a flocking apparatus, a hopper for holding a supply of flock and including a bottom portion at least partially constructed as a sieve, said hopper defining a closed path for the flock, support means disposed in spaced relationship with said hopper, vibrator means for initiating vibratory motion of said hopper, said vibrator means including spring means operably connected with said hopper and said support means and electromagnetic vibrator means operably associated with said spring means for vibrating said spring means, said spring means and said electromagnetic vibrator means being inclined at an angle relative to said hopper and said support means, and at least some of said spring means and associated electromagnetic vibrator means being oriented in a direction different from others of said spring means and electromagnetic vibrator means such that vibratory motion of said hopper is initiated in nonparallel orbital paths.

2. In a flocking apparatus as recited in claim 1 wherein said hopper includes a pair of substantially parallel, elongated and spaced straight sections interconnected with curved sections at the ends thereof to define a closed path for the flock.

3. In a flocking apparatus as recited in claim 2 wherein some of said spring means and associated electromagnetic vibrator means oriented in a first direction are associated with said straight sections of said hopper and others of said spring means and associated electromagnetic vibrator means oriented in a second direction different from the first direction being associated with said curved sections.

References Cited
UNITED STATES PATENTS

| | | | |
|---|---|---|---|
| 560,575 | 5/1896 | Draver | 209—332 |
| 629,407 | 7/1899 | Wellington | 209—275 X |
| 2,925,178 | 2/1960 | Dreshman | 209—332 X |
| 3,444,999 | 5/1969 | Hurst | 209—332 X |
| 707,490 | 8/1902 | Zwermann | 118—308 |
| 2,689,597 | 9/1954 | Kinnear | 118—308 X |
| 2,926,627 | 3/1960 | Demorest et al. | 118—308 X |
| 3,269,356 | 8/1966 | Friderici | 118—640 |

J. P. McINTOSH, Primary Examiner

U.S. Cl. X.R.

209—332